Figure 8:
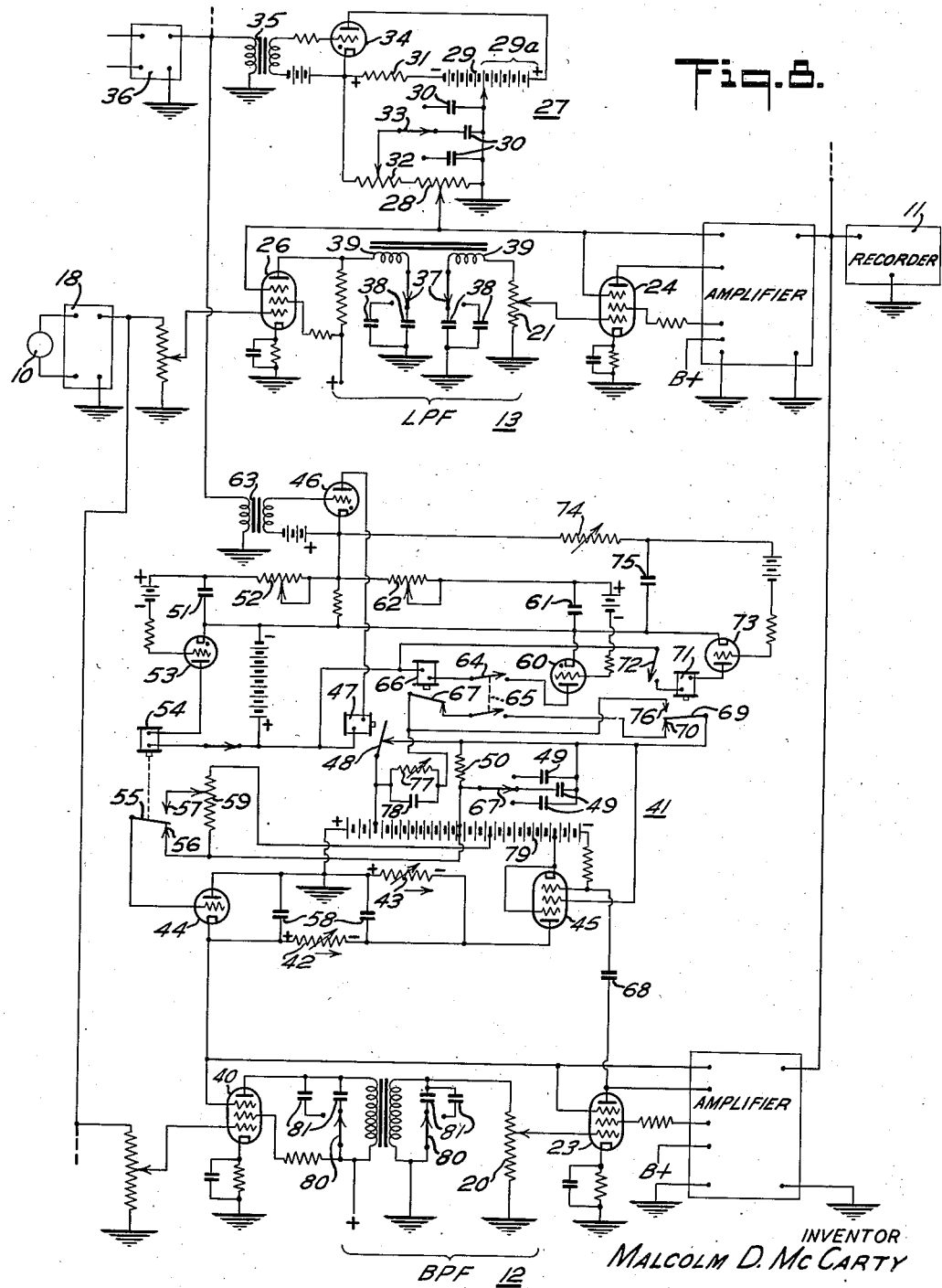

July 3, 1951  M. D. McCARTY  2,558,868
SEISMIC RECORDING SYSTEM
Filed July 1, 1946  2 Sheets-Sheet 1
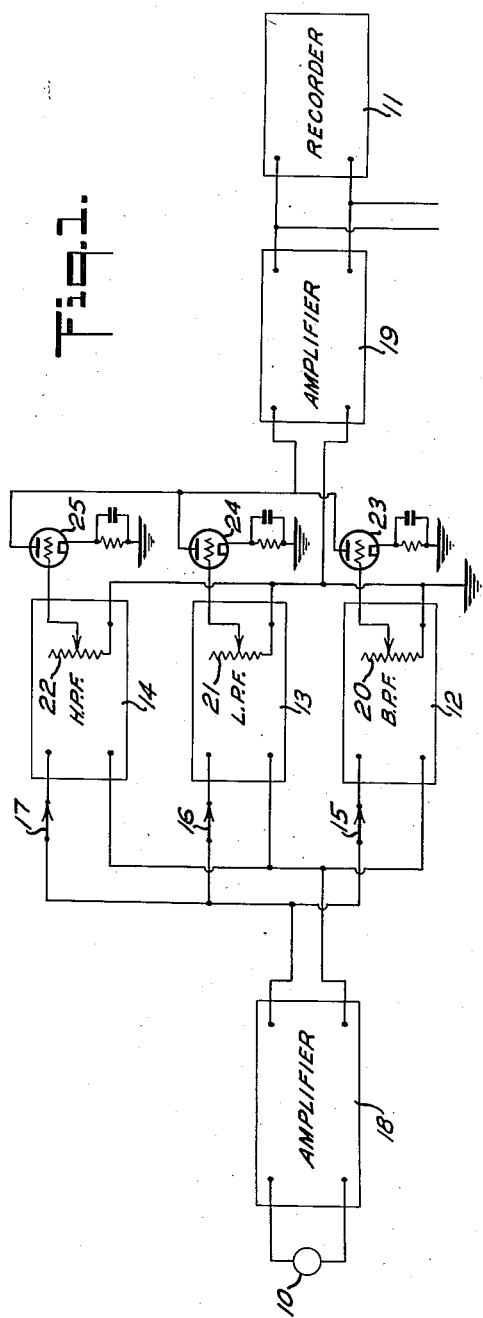
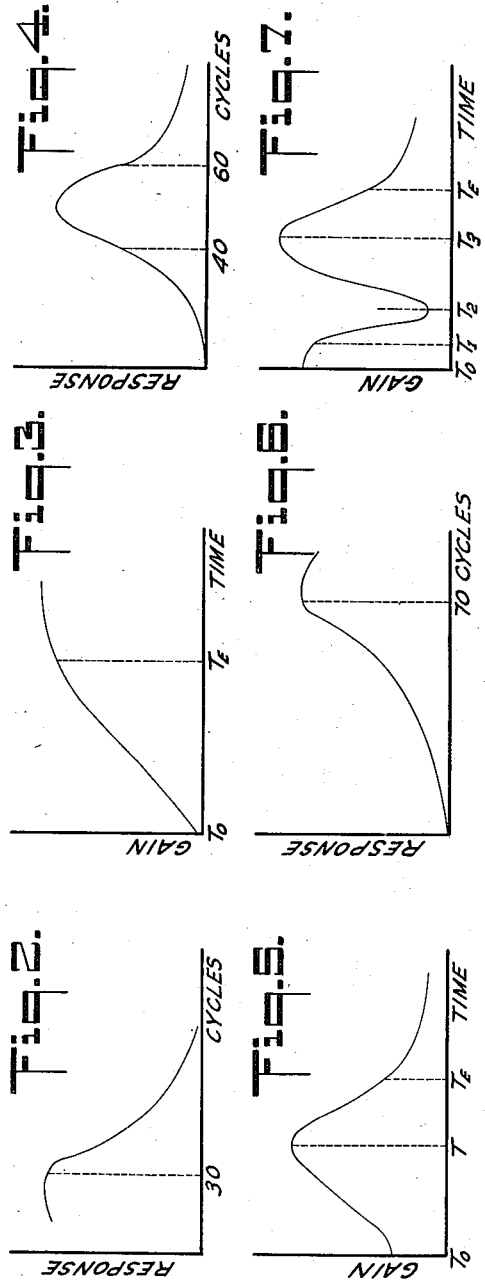
INVENTOR
MALCOLM D. McCARTY
BY
Sidney A. Johnson
ATTORNEY Patented July 3, 1951

2,558,868

UNITED STATES PATENT OFFICE 2,558,868

SEISMIC RECORDING SYSTEM

Malcolm D. McCarty, Dallas, Tex., assignor, by mesne assignments, to Socony-Vacuum Oil Company, Incorporated, New York, N. Y., a corporation of New York Application July 1, 1946, Serial No. 680,795

5 Claims. (Cl. 346—33)

This invention relates to seismic prospecting and particularly concerns the electrical system between the geophones, or equivalent devices which transform seismic waves into electrical signals, and the equipment utilized to record the signals.

In carrying out a seismic exploration of a particular area, charges of dynamite are detonated in shotholes and the seismic waves generated by the explosive charge and their reflections are detected by a spread of geophones, the output signals of which are recorded to produce seismograms which may be interpreted to yield valuable information as to the location and character of subsurface strata. The frequency of the reflections of seismic waves has been found to differ, both with time during a recording period, and in different parts of the country.

In accordance with the present invention, a system is provided by means of which the operator may directly control or change the emphasis or effect upon the seismogram of signals of a certain frequency and he can attenuate as desired, signals of other frequencies.

In some cases, it is desired to change the amplitude of signals of a given frequency either by increasing or decreasing the gain, while simultaneously changing the gain of signals of other frequencies. In this manner, reflections as recorded on the seismogram stand out more clearly and, therefore, the seismic information obtained is more valuable than in the absence of the present invention.

In carrying out the invention in one form thereof, seismic signals from one or more geophones pass through several frequency-control channels in which the gain and the frequency response may be varied and automatically controlled with respect to time in any desired predetermined manner to the end that the desired data will be emphasized on the seismogram. For example, at the beginning of a seismogram the higher frequency range of from forty cycles to sixty cycles per second may be amplified twenty-five per cent more than the lower frequencies. Later the lower frequencies may be amplified to a much greater degree than the higher frequencies. In some cases, the high-frequency energy may be attenuated near the beginning of the record and the low frequency amplified so that a greater emphasis of low-frequency signals may be obtained at a time when the high-frequency energy is normally at a higher level.

The invention also relates to features of combination and arrangement hereinafter described.

For further explanation of the invention, reference is made to the accompanying drawings, in which:

Fig. 1 is a block diagram of a portion of a seismic prospecting system;

Figs. 2 to 7, inclusive, are explanatory curves referred to in discussion of Figs. 1 and 8; and Fig. 8 is a schematic diagram of seismic amplifier channels.

Referring to Fig. 1, between the geophone 10, or equivalent device responsive to seismic waves for producing electrical signals therefrom, and the recorder 11 of suitable type to produce a record or trace of the waves, are several signal channels in parallel to each other and having different frequency-response characteristics. For example, the channel 12 may include a band-pass filter B. P. F. which transmits with minimum attenuation frequencies lying, for example, within the range of about forty cycles to sixty cycles; a low-pass filter L. P. F. is included in channel 13 and favors frequencies below, for example, about thirty cycles; the high-pass filter H. P. F. included in channel 14 may be designed markedly to attenuate frequencies below about seventy cycles. Switches 15, 16 and 17 may be provided to permit utilization of any two or more of these signal channels. Each channel may include an amplifier, and additionally, or alternatively, may be preceded by a geophone amplifier 18, preferably one whose frequency-response characteristic is substantially flat, at least for the range of frequencies here of interest; namely, from about twenty cycles to about eighty cycles.

For predetermination of the extent to which each of the channels contributes to their compounded signal as supplied to the seismograph recorder 11, each channel is provided, preferably as an output impedance, with a voltage divider, such as potentiometer 20, 21 or 22, manually adjustable by the operator to predetermine the fractional part of the total output of each channel which is applied to the respective grids of the tubes 23, 24 and 25 individual to the channels and whose common output circuit is coupled to the recorder 11, preferably through an amplifier 19. By this arrangement, the operator can adjust and control the proportionate amount of energy in each frequency region he may desire to allow to be transmitted for compounding in a single recorded trace. For example, he may wish to have recorded principally energy whose frequency is within the range of from 40 cycles to 60 cycles through channel 12 which includes the band-pass filter; he may desire to record, for example, twenty-five per cent of the higher frequency energy through channel 14 and, to make certain of obtaining a record of the low-frequency energy from deep reflected layers, may wish to include in the compounded signal fifty per cent of the lower frequency energy through the channel 13. To attain that desired end, the potentiometers 20, 21 and 22 are manually adjusted to their respective proper settings before the charge is detonated.

By the arrangement described, advantage is taken of the fact that in the interval following a shot, the seismic energy picked up by the geophones is predominately of different frequencies for the direct, refracted and reflected waves. By having channels which favor the different predominant frequencies and by providing for predetermination of the per cent to which each contributes to a trace, it is possible to produce a record which may be readily interpreted in ascertainment of the depths and contours of the subterranean strata.

Preferably, each of the channels includes an amplifier whose gain is automatically controlled as a function of time: for example, the low-pass channel 13 whose frequency-response characteristic may be generally as shown in Fig. 2. is provided with an amplifier whose gain is automatically increased rather slowly during the recording interval following the shot—generally in the manner shown in Fig. 3—so that as the end of the recording interval is approached the gain of this channel approaches its maximum.

The amplifier included in the band-pass channel 12, whose frequency-response characteristic is generally as shown in Fig. 4, is automatically controlled so that its gain, as shown in Fig. 5, rises more rapidly to a maximum and then decreases to a substantially lower value before the end of the recording time.

The amplifier for channel 14, which includes the high-pass filter H. P. F. having a frequency-response characteristic such as generally exemplified by Fig. 6, may be automatically controlled so that its gain, initially high but not necessarily maximum, falls to a minimum shortly after the shot impulse, rises to a maximum, and then falls again to low value before the end of the recording time, all as generally shown in Fig. 7.

The frequency-response characteristics and the time-gain characteristics of the several channels are adjustable within suitable limits to allow the operator to preset the frequency response and gain characteristics of the individual channels. By such adjustments, the operator can predetermine the emphasis placed upon the different frequencies at different times in the recording interval, thus to make evident in the record the waves corresponding with both shallow and deep reflections.

The particular types of filter circuits and gain-control circuits used may, per se, be of any type known to the art. The control circuit for obtaining the time-gain characteristics shown in Fig. 3 may be generally similar to that shown in co-pending application, Serial No. 539,146, of Shimek et al., now Patent No. 2,420,571; the control system for obtaining the time-gain characteristic generally as shown in Fig. 5 may be similar to that shown in application, Serial No. 588,350, of Shimek et al., now Patent No. 2,408,001; and the arrangement for obtaining the time-gain characteristic such as shown in Fig. 7 may be an extension, hereinafter described, of the latter of the above two arrangements.

Referring to Fig. 8, the low-pass filter 13 may include two sections preceded by an amplifier tube 26 whose gain is controlled by a network 27. It shall be understood, of course, that this channel and the others may include additional filter sections and additional tubes whose gain is automatically controlled. In the particular arrangement shown, the biasing potential applied to the suppressor grids of the amplifier tubes 24 and 26 is derived from a potentiometer 28 supplied with current from a battery 29 or equivalent source, the position of the potentiometer contact being manually adjustable to predetermine the desired minimum gain of the amplifier system of this channel.

In the interval preceding the "shot," the battery 29 charges one of the condensers 30 of different capacities selectively included in a charging circuit comprising the resistance 31, the left-hand portion of the potentiometer 32, and the selector switch 33. When an initiating signal impulse is applied to the grid of the Thyratron tube 34 or equivalent the tube "fires," whereupon its plate current traverses the potentiometers 28 and 32 in the direction reverse to that of the current from battery 29: in addition, the flow of plate current through resistor 31 increases the voltage drop across it and so reduces the effective voltages applied by battery 29 to the slidewires 28, 32, and to the condenser 30. In consequence, the suppressor grid potential of tubes 24 and 26 rises to a less negative value and at a rate predetermined by the time constant of the discharge circuit including the selected condenser 30, the potentiometer 28, and that portion of the potentiometer 32 to the right of its contact as seen in Fig. 8. The combined effect of the frequency-response characteristic, Fig. 2, and the time gain characteristic, Fig. 3, of this channel is substantially to exclude the higher frequencies throughout the recording run and progressively to emphasize the low frequencies as the end of the recording time is approached.

The rate of rise and final value of the gain may be predetermined by selection of the applied voltage (29) and by selection of the time constant of the discharge circuit as determined by the settings of potentiometer 32 and selector switch 33.

The frequency-response characteristic is also preferably adjustable within predetermined limits; in the particular filter shown, the cutoff frequency may be shifted by actuation of the switches 37 selectively to include certain pairs of condensers 38, the different pairs being of different capacity, in circuit with the filter inductors 39.

The channel 12 including the band-pass filter B. P. F. of desired number of sections also includes one or more amplifier tubes whose gain is controlled as a function of time. In the particular arrangement shown, the potential of the suppressor grids of the tubes 23 and 40 is automatically varied by the control network 41. The suppressor grids are biased by the algebraic sum of the voltage drops across the resistors 42 and 43 in series between ground and the common lead of suppressor grids of amplifier tubes 40 and 23. The resistor 42 is traversed by the anode current of the triode 44, and resistor 43 is traversed by the anode current of another tube 45, preferably a pentode. The currents for these two tubes are in opposite directions through the resistors so that the suppressor grid potential of tubes 23 and 40 becomes less negative (higher amplifier gain) upon an increase in the anode current of tube 44 or a decrease in anode current of tube 45.

To obtain the time gain characteristic shown in Fig. 5, the magnitudes of resistors 42 and 43 and the voltages applied to the electrodes of the tubes 44 and 45 are such that before the initiating signal impulse is received by the control network 41, the suppressor grids are to suitable extent negative and the gain of the amplifier of this channel 10 is well below maximum. When a signal impulse, derived from the explosion of a charge or reception of the first waves by the "uphole" geophone, is applied to the grid of the Thyratron 46 or equivalent, the relay 47 in the plate circuit thereof is energized. The resulting movement of contact 48 of the relay effectively disconnects the screen-grid electrode of pentode 45 from a point of fixed high positive potential defined by battery 79 or equivalent, and connects it to a point whose potential falls to a lower fixed positive potential. The rate at which the screen-grid voltage falls to the lower value is determined by the time constants of the network including a selected condenser 49 and the resistor 50. Accordingly, the anode current of the pentode 45 decreases, so reducing the voltage drop across the resistor 43 and allowing the suppressor grids of the amplifier tubes 23 and 40 to become less negative. Accordingly, the gain of the amplifier including the tubes 23 and 40 rises, generally as shown in the left-hand portion of the curve of Fig. 5 from time $T_0$ to time $T$.

The anode current of the Thyratron 46 is also utilized to charge a condenser 51 at a rate controlled by adjustable resistor 52. At a predetermined time $T$, Fig. 5, after firing of Thyratron 46, the voltage across condenser 51, Fig. 8, attains a value sufficient to effect firing of a second Thyratron 53 whose plate circuit includes a relay 54. The resulting movement of relay contact 55 from engagement with contact 56 and into engagement with contact 57 affects application to the grid of tube 44 of a voltage which is more negative or less positive than before. Accordingly, the anode current of the tube 44 is reduced and the suppressor grids of tubes 23 and 40 are biased more negatively. The gain of the amplifier of channel 12, therefore, falls off at a rate determined by the time constant of the network including the resistor 42 and condensers 58. Thus, at time $T_E$, at which the gain of the channel 13 including the low-pass filters is at or near maximum, Fig. 3, the gain through channel 12 including the band-pass filters has been reduced substantially below maximum, Fig. 5. The eventual minimum gain of channel 12, as determined by the setting of the manually adjustable contact of the potential divider 59, may be substantially less than the gain at the time of the initial signal impulse.

By coupling the control grid of the tube 45, as by condenser 68, to a suitable point in the amplifier system of channel 12, there may be obtained an automatic volume control action such as described in the aforesaid Shimek Patent No. 2,403,001. This same action may be obtained in the amplifier system for the low-pass channel 13 by replacement of the control network 27 by a simplified form of control network 41, as thus far described, from which the Thyratron 53 and relay 54 are omitted.

Control system 41 as thus described imparts to channel 12 a gain characteristic similar to that shown in Fig. 5. In brief résumé, at time $T_0$ coincident with explosion of the charge, or if desired, at the time of arrival of the first waves resulting therefrom at one of the geophones, the tube 46 fires to effect progressive rise in the amplifier gain to a maximum or until time $T$, at which time the second Thyratron 53 fires to effect progressive decrease in gain of the amplifier so that at time $T_E$ the gain in the band-pass channel 12 is low whereas the gain in the low-pass channel 13 is high.

When in channel 12, or in any of the other channels, it is desirable to utilize a gain characteristic such as shown in Fig. 7, the control system 41 may be expanded to include additional circuit elements now described.

The condenser 61 in the grid circuit of a third Thyratron 60, or equivalent, is charged by the anode current of tube 46 which, as above described, is fired at time $T_0$ in response to an initiating signal applied thereto by transformer 63 or equivalent. The interval between firing of tube 46 and subsequent firing of tube 60 at time $T_2$, Fig. 7, is determined by the time constant of the circuit including adjustable resistor 62 and the condenser 61. With the switch 65 closed to obtain the characteristic of Fig. 7, the firing of tube 46 does not then cause rise in gain of the amplifier because the contacts of relay 47 are shunted by a path including contact 67 of relay 66, switch 65 and contacts 69, 70 of relay 71. Accordingly, the rise in gain, from time $T_2$ to time $T_3$, Fig. 7, does not occur until relay 66 in the anode circuit of Thyratron 60 is energized by firing of that tube to open contact 67 and so break the aforesaid shunt circuit around the contacts of relay 47. In effect, the rise in gain previously described in connection with actuation of contact 48 of relay 47 is delayed until tube 60 fires.

In the meantime, however, the tube 53 has fired at time $T_1$ to effect, as previously described, by its control of tube 44, a reduction in gain of the amplifier.

Thus, the amplifier gain remains high, though not necessarily maximum, from time $T_0$ to time $T_1$, at which time tube 53 fires to initiate reduction in gain which is low or falling at time $T_2$, at which time the tube 60 fires to initiate increase in gain. If it is desired that the gain should again decrease before time $T_E$, there is effectively included in the control system as by prior closure of switch 72, a fourth Thyratron 73 or equivalent which is fired at time $T_3$, Fig. 7, predetermined by adjustment or preselection of the time constant of the input circuit therefor, including the resistor 74 and condenser 75 charged by the anode current of one of the earlier fired Thyratrons; for example, and as shown, the Thyratron 46. The energization of relay 71 by the anode current of Thyratron 73 causes the relay contact 69 to move away from contact 70 and into engagement with contact 76, thus effectively to connect the screen-grid of tube 45 to a point of higher positive potential. The resulting increase in anode current of tube 45 through resistor 43 causes the suppressor grids of tubes 23 and 40 to become more negative, so to reduce the signal gain. The rate at which the screen-grid voltage rises to its new value is determined by the time constant of the network comprising resistor 77 and condenser 78 in circuit therewith and the battery 79, or equivalent current source.

The cutoff frequencies of the band-pass filter B. P. F. may be shifted by positioning the switches 80 selectively to include in circuit a particular pair of filter condensers 81 having appropriate values of capacity. In generally like manner, the cutoff frequency of the high-pass filter may be adjusted to desired magnitude.

By selection of the Thyratrons 53, 60 and 73 in circuit, individually or in combination, and their time of firing after firing of tube 46, the control circuit 41 may be utilized to obtain any of the characteristics of Figs. 3, 5 and 7, as well as others not specifically described, so that by providing each of several parallel signal channels between a geophone and its recorder with such a control circuit 41 practically any desired frequency-time-gain characteristic may be obtained for each of the channels; and by compounding the outputs of the several channels in desired proportion by adjustment of the potentiometers 20, 21, and 22 or equivalent, any desired proportioning of the outputs of the channels may be obtained.

What is claimed is:

1. A system for seismic prospecting comprising a geophone for converting direct, refracted and reflected seismic waves produced by a shot into electrical signals of frequencies within the range from about 20 to about 80 cycles, and means for producing from said signals of the geophone a record trace readily interpreted in ascertainment of the depths and contours of subterranean strata comprising signal amplifier channels in parallel and upon which the aforesaid signals are impressed, one of said channels including a frequency-selective network favoring transmission therethrough of lower frequencies of said range, a second of said channels including a frequency-selective network favoring transmission therethrough of intermediate frequencies of said range, and a third of said channels including a frequency-selective network favoring transmission therethrough of higher frequencies of said range, automatic gain-control systems for respectively varying the gains of said amplifiers as different predetermined functions of time during recording of the aforesaid signals of said geophone, the gain-control system for said one of said channels progressively increasing the gain at said lower frequencies as a predetermined function of time, the gain-control system for said second channel progressively increasing and then decreasing the gain at said intermediate frequencies as a predetermined function of time and the gain-control system for said third channel sequentially decreasing, increasing and then decreasing the gain at said higher frequencies as a predetermined function of time, electrical means effective in response to occurrence of said shot to initiate the aforesaid time-variation of the gains of said amplifiers by said gain-control systems, and a recorder upon which the outputs of said channels are impressed to produce a single record of said waves with respect to time in which record, by virtue of the aforesaid different time-variation of gain of said amplifiers for said different frequencies, the direct, refracted and reflected waves are clearly distinguishable.

2. A system for seismic prospecting comprising a geophone for converting direct, refracted and reflected seismic waves produced by a shot into electrical signals of frequencies within the range from about 20 to about 80 cycles, and means for producing from said signals of the geophone a record trace readily interpreted in ascertainment of the depths and contours of subterranean strata comprising signal amplifier channels in parallel and upon which the aforesaid signals are impressed, one of said channels including a frequency-selective network favoring transmission therethrough of lower frequencies of said range and another of said channels including a frequency-selective network favoring transmission therethrough of higher frequencies of said range, an automatic gain-control system for the amplifier of said one of said channels effective in the recording interval subsequent to said shot progressively to increase the gain at said lower frequencies as a predetermined function of time, an automatic gain-control system for the amplifier of said other of said channels effective in said recording interval sequentially to decrease, increase and decrease the gain at said higher frequencies as a predetermined function of time, electrical means effective in response to occurrence of said shot to initiate the aforesaid time-variation of the gains of said amplifiers by said gain-control systems, and a recorder upon which the outputs of said channels are impressed to produce a single record of said waves in which record, by virtue of the different time-variation of the gains of said amplifiers for said different frequencies, the direct, refracted and reflected waves are clearly distinguishable.

3. A system for seismic prospecting comprising a geophone for converting direct, refracted and reflected seismic waves produced by a shot into electrical signals of frequencies within the range of from about 20 to 80 cycles, and means for producing from said signals of the geophone a record trace readily interpreted in ascertainment of the depths and contours of subterranean strata comprising signal amplifier channels in parallel and upon which the aforesaid signals are impressed, one of said channels including a frequency-selective network favoring transmission of lower frequencies of said range and another of said channels including a frequency-selective network favoring transmission therethrough of intermediate frequencies of said range, an automatic gain-control system for the amplifier of said one of said channels effective in the recording interval subsequent to said shot progresively to increase the gain at said lower frequencies as a predetermined function of time, an automatic gain-control system for the amplifier of said other of said channels effective in said recording interval progressively to increase and then decrease the gain at said intermediate frequencies as a predetermined function of time, electrical means effective in response to occurrence of said shot to initiate the aforesaid time-variation of the gains of said amplifiers by said gain-control systems, and a recorder upon which the outputs of said channels are impressed to produce a single record of said waves in which record, by virtue of the different time-variation of the gains of said amplifiers for said different frequencies, the direct, refracted and reflected waves are clearly distinguishable.

4. A system for seismic prospecting comprising a geophone for converting direct, refracted and reflected seismic waves produced by a shot into electrical signals of frequencies within the range from about 20 to about 80 cycles, and means for producing from said signals of the geophone a record trace readily interpreted in ascertainment of the depths and contours of subterranean strata comprising signal amplifier channels in parallel and upon which the aforesaid signals are impressed, one of said channels including a frequency-selective network favoring transmission therethrough of intermediate frequencies of said range and another of said channels favoring transmission therethrough of higher frequencies of said range, an automatic gain-control system for the amplifier of said one of said channels effective in the recording interval subsequent to said shot progressively to increase and then decrease the gain at said intermediate frequencies as a predetermined function of time, an automatic gain-control system for the amplifier of said other of said channels effective in said recording interval progressively to decrease, then increase and then decrease the gain at said higher frequencies as a predetermined function of time, electrical means effective in response to occurrence of said shot to initiate the aforesaid time-variation of the gains of said amplifiers by said gain-control systems, and a recorder upon which the outputs of said channels are impressed to produce a single record of said waves in which record, by virtue of the different time-variation of the gains of said amplifiers for said different frequencies, the direct, refracted and reflected waves are clearly distinguishable.

5. A system for seismic prospecting comprising a geophone for converting direct, refracted and reflected seismic waves produced by a shot into electrical signals of frequencies within the range from about 20 to 80 cycles, and means for producing from said signals of the geophone a record trace readily interpreted in ascertainment of the depths and contours of subterranean strata comprising signal amplifier channels in parallel upon which the aforesaid signals are impressed, said channels respectively including frequency-selective networks preadjusted to favor different preselected bands of frequencies respectively including predominant frequencies of said direct, refracted and reflected seismic waves, automatic gain-control systems for varying the respective gains of said amplifiers as different preselected functions of time during the recording interval following said shot, electrical means effective in response to occurrence of the shot to initiate the aforesaid time-variation of the gains of said amplifiers by said gain-control systems, output tubes having input circuits respectively including said channels and having a common output circuit, adjustable voltage-dividers in said input circuits of said output tubes preset to predetermine the percentage of the total available output of each channel which is applied to the recorresponding output tube, electrical means effective in response to occurrence of the shot to initiate the aforesaid time-variation of the gains of said amplifiers by said gain-control means, and a recorder in said common output circuit of said output tubes for response to the different seismic wave frequencies in proportions predetermined by the settings of said voltage-dividers and by the aforesaid time-variation of the gains of said amplifiers, said recorder thereby producing a single record of said signals with respect to time in which the direct, refracted and reflected waves are clearly distinguishable.

MALCOLM D. McCARTY.

REFERENCES CITED

The following references are of record in the file of this patent:

UNITED STATES PATENTS

| Number | Name | Date |
| --- | --- | --- |
| 1,635,959 | Round | July 12, 1927 |
| 1,698,269 | Konheim | Jan. 8, 1929 |
| 1,791,319 | Miller | Feb. 3, 1931 |
| 2,008,699 | Hammond, Jr. | July 23, 1935 |
| 2,068,685 | Lansing | Jan. 26, 1937 |
| 2,168,047 | Skellet | Aug. 1, 1939 |
| 2,195,152 | Roux et al. | Mar. 26, 1940 |
| 2,298,987 | Thomsen | Oct. 13, 1942 |
| 2,340,364 | Bedford | Feb. 1, 1944 |
| 2,348,409 | Parr Jr. | May 9, 1944 |
| 2,352,869 | Tolk | July 4, 1944 |
| 2,360,507 | Menton | Oct. 17, 1944 |
| 2,374,204 | Hoover, Jr. | Apr. 24, 1945 |
| 2,395,289 | Neufeld | Feb. 19, 1946 |
| 2,395,481 | Hoover, Jr. | Feb. 26, 1946 |
| 2,402,378 | Davies | June 18, 1946 |
| 2,430,983 | Hoover, Jr. | Nov. 18, 1947 |